United States Patent

Papp

[15] 3,670,494
[45] June 20, 1972

[54] METHOD AND MEANS OF CONVERTING ATOMIC ENERGY INTO UTILIZABLE KINETIC ENERGY

[72] Inventor: Josef Papp, San Pedro, Calif.
[73] Assignee: Environetics, Inc., Gardena, Calif.
[22] Filed: Oct. 31, 1968
[21] Appl. No.: 772,077

[52] U.S. Cl. ............................60/23, 60/1, 60/27, 123/1, 176/39
[51] Int. Cl. .......................F01k 27/00, F03g 7/06
[58] Field of Search ......................60/23, 25, 27, 1

[56] References Cited

UNITED STATES PATENTS

| | | | |
|---|---|---|---|
| 2,532,096 | 11/1950 | Hartley | 60/25 |
| 2,548,708 | 4/1951 | Dickey | 60/25 |
| 1,916,235 | 7/1933 | Ruben | 60/1 |

*Primary Examiner*—Martin P. Schwadron
*Assistant Examiner*—Robert R. Bunevich
*Attorney*—Miketta, Glenny, Poms and Smith

[57] ABSTRACT

Method of utilizing potential energy of atoms and various forms of radiation (electrons, photons, positrons, gamma beta and alpha radiations, etc.) in a controlled power generating system; effective mixtures of chemical elements adapted for use in the method; the preparation of charges of ingredients for use in virtually gas-tight power generating devices; the activation and control of such charges and devices; structural requirements of power generating devices utilizing the methods and compositions.

18 Claims, 4 Drawing Figures

PATENTED JUN 20 1972 3,670,494

INVENTOR.
JOSEF PAPP

By
Mikulla, Glenny, Pome & Smith

ATTORNEYS.

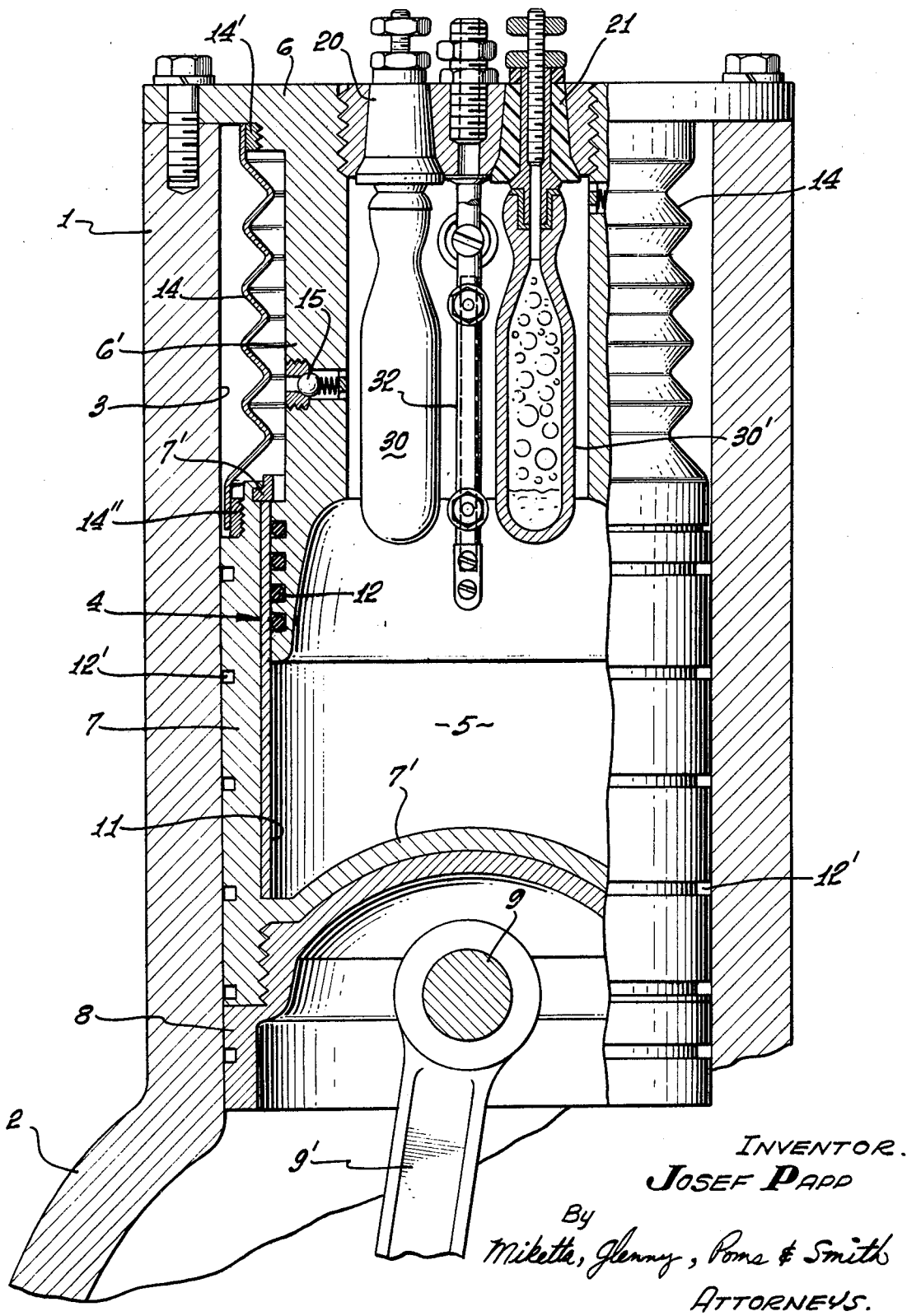

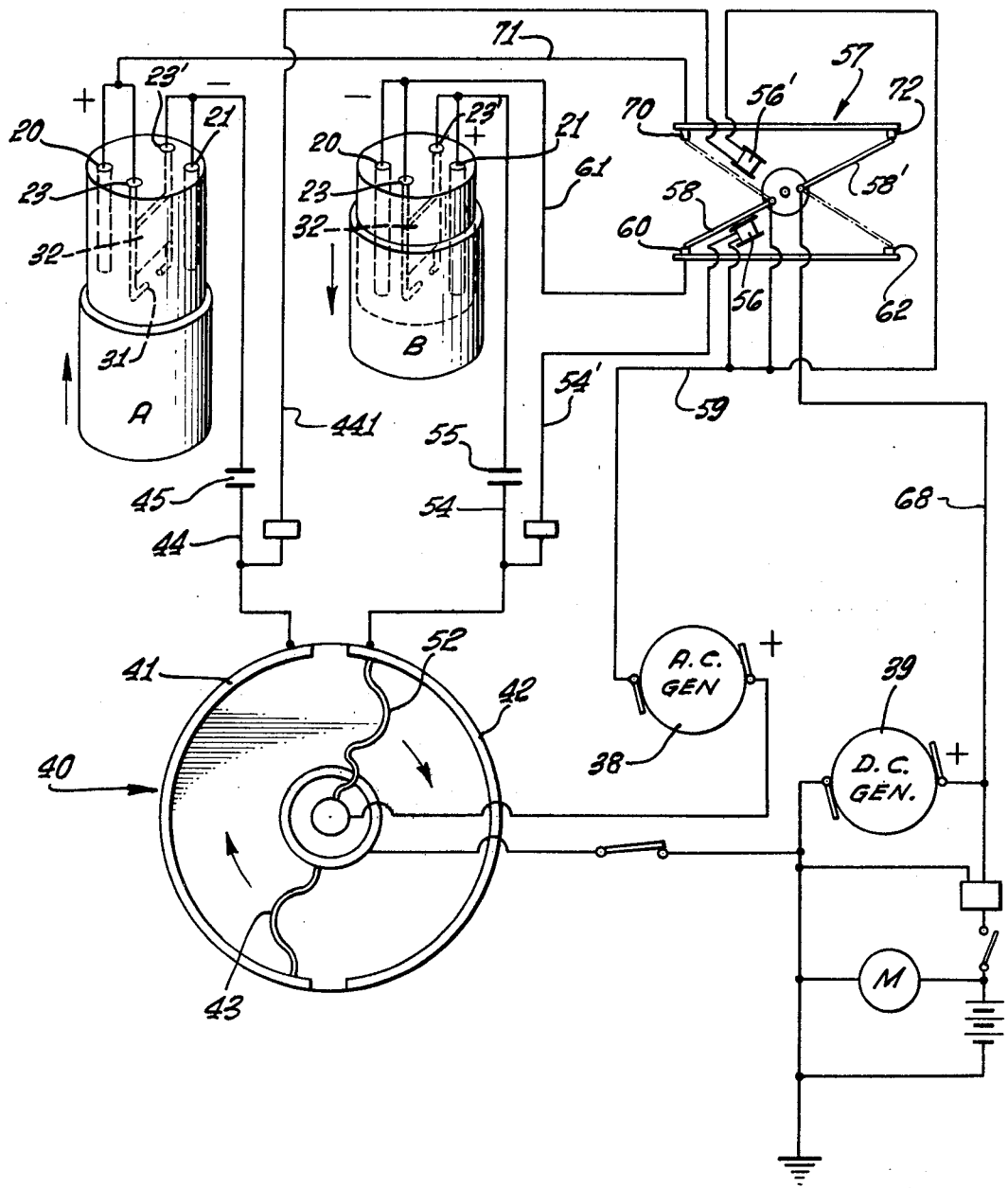

METHOD AND MEANS OF CONVERTING ATOMIC ENERGY INTO UTILIZABLE KINETIC ENERGY

This invention is directed to a source of energy such as an engine wherein the energy is derived from rearrangements within an atom or atoms. Since such rearrangements are reversible, the utilization of suitably charged elements or atoms which are capable of rearrangement permits the conversion of potential energy into kinetic energy over very long prolonged periods of time with a single charge of atoms or elements of suitable composition. The invention is postulated upon the premise that when a substance is exposed to conditions under which the absorption of energy is possible (as by the use of suitable electric charge or discharge), the electrons which are in their lowest energy or ground state take up energy and pass into the states of higher energy or excited state. The return of electrons to the lower state liberates energy. By the use of atoms of suitable electronic configuration and by the periodic subjection of such atoms to an electric charge or discharge, the electrons may be caused to rapidly move from one arrangement into another thereby permitting the utilization of the energy liberated by the movement of the electrons from one orbit or energy level to another.

Under the conditions here described, the quantum yield is maintained high and by maintaining the radiation above the level at which the molecules stay intact, the electronic energy is utilized as heat. This is attained, in part at least, by the use of substances capable of emitting gamma and beta rays and electrons, and the generation of visible light and fluorescense whereby large numbers of photons are made available. These substances and conditions, together with cyclic changes in magnetic field, polarity and potential supplied to activating cells to stimulate radiation, and cyclic generation and condensation of vapors in a trapped volume of noble and other gases capable of existing in higher energy states, produce expansion and contraction or condensation of such trapped gases in a controlled cyclic manner, the energy thus produced being capable of use in generating power which can be converted into rotative or linear forces.

Since theorists in quantum mechanics may come to conflicting opinions and explanations of the same observed results, applicant will state facts and observations and describe an operative and tested embodiment without excessive discussion of theory, applicant being willing to adopt that explanation of some aspects of operation which will stand the test of time. Data contained in this application was largely derived from a document prepared by applicant in the Hungarian language and translated to English by a person who was not knowledgeable in science or the subject matter.

Among the objects of this invention, I list:

1. To provide a virtually sealed telescoping chamber of variable volume provided with a precharged energy supply having a long life, and composed essentially of noble gases and substances capable of emitting beta and gamma rays and electrons, said chamber being capable of forcibly expanding and contracting in volume under the influence of electrical timing to thereby be used as a source of controlled energy and power.

2. To provide a two cycle reciprocating engine which does not use fuel intake valves or exhaust valves, does not require an air supply and does not emit exhaust gases.

3. To provide a precharged engine of the character stated in item 2 capable of generating power for a period of from 2,000 to over 10,000 hours continuously or until mechanical breakdown) without the addition of fuel, injection of air or discharge of gases.

4. To provide a low temperature system of converting potential energy into kinetic energy 5. To provide a system or method of generating power by the use of mixtures of gases and substances (referred to in item 1) wherein the reactions are cyclic and under control.

6. To disclose and provide the constructions, elements and components, molecular and atomic fuel compositions and method of preparation and operation which exemplify the teachings of this invention.

The invention may be utilized in many fields of endeavor for many industrial, scientific and military purposes, both terrestial, in space and under water. For purposes of illustration and to facilitate understanding, an exemplary reciprocating engine will be described by reference to the following drawings in which:

FIG. 2 is a transverse section taken along the plane II—II in FIG. 1, some parts being in partial elevation;

FIG. 4 is a diagrammatic representation illustrating one form of an electric supply and timing control system.

Figure 1:
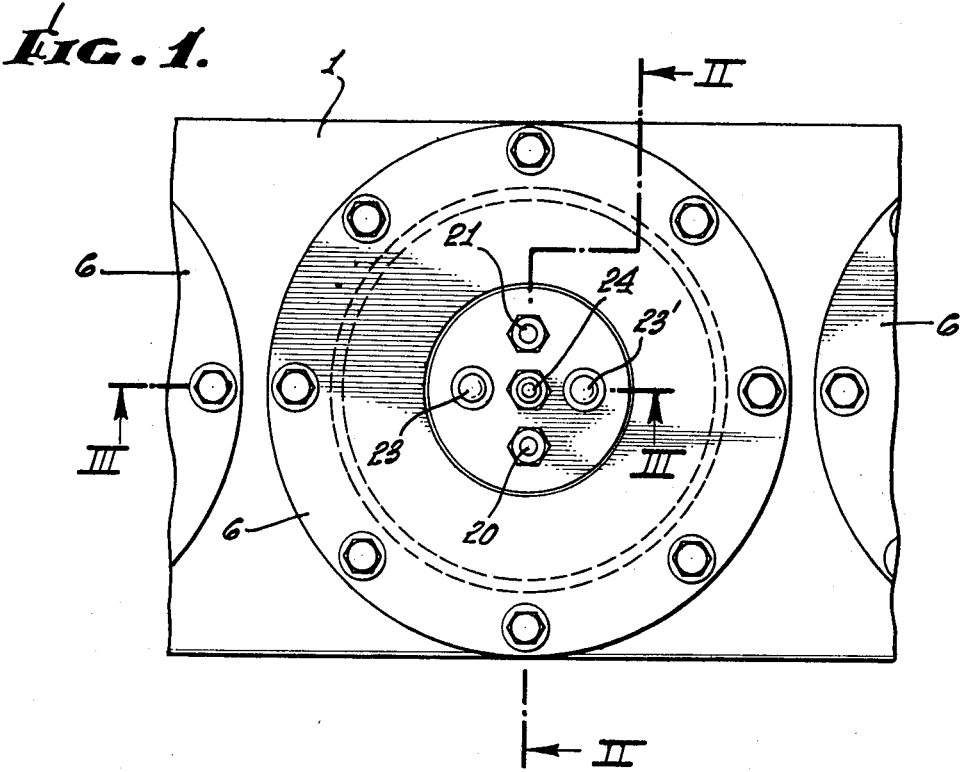
FIG. 1 is a top or plan view of a single cylinder (of an in-line assembly) of an engine embodying aspects of this invention.

FIGS. 1 and 2 illustrate a motor block 1 provided with or mounted upon a crankcase housing 2; the crankshaft, transmission and other conventional elements are not illustrated. The block 1 is provided with a plurality of parallel bores such as 3, each being adapted to receive a cylinder providing a variable volume chamber 5. Each cylinder 4 comprises a stationary upper, hollow head portion 6 firmly attached by its enlarged head end to the upper surface of the block 1, and a movable portion 7 in telescopic relation to the skirt 6' of the head portion 6. The lower end of the movable portion 7 is closed and is shown provided with an inwardly extending domed surface 7'; this movable portion of the hollow cylinder which forms the enclosed chamber 5 is shown attached to a lower extension 8 which carries the wristpin 9 to which the piston rod 9' is connected. It is to be understood that the parts 7 and 8 may be made integral although a removable threaded connection facilitates assembly. In FIG. 2, the chamber is shown in its substantially expanded position; in actual practice, the chamber is precharged with a mixture of gases and an aqueous component and such gases are caused to forcibly expand and contract in a repetitive and controlled manner as hereafter described.

The chamber 5 should be substantially gas-tight; in order to facilitate the attainment of a gas-tight seal, the lower portion 7 is shown provided with a steel liner 11 preferably having a highly polished or burnished, reflecting internal surface. The exterior of the lower end of skirt 6' of the stationary portion 6 is shown provided with a series of grooves carrying O-rings of suitable material adapted to produce a hermetic seal as at 12. The exterior of lower portion 7 is provided with a plurality of oil grooves 12' for distribution of lubricating oil.

In the form of construction illustrated, the head end of cylinder portion 6 is shown connected to the upper end of the movable portion 7 by means of a gas retaining bellows 14 which may be made of any non-oxidizing, flexible and resilient sheet metal, the upper and lower ends of such bellows being suitably attached to the head and to the upper end of movable cylinder portion 7 as by means of threaded internal rings indicated at 14' and 14''. A split expansion ring 7' carried by the upper edge of movable portion 7 may be used to prevent separation of the chamber portions during installation. The skirt wall 6' of the upper portion is preferably provided with a plurality of check valves such as 15 at different distances from the head for preventing internal pressure in chamber 5 (or within the bellows) from rupturing the bellows.

The head of the stationary portion 6 is shown provided with internally threaded ports adapted to receive and hold in gas-tight relation the upper terminal portions of an anode 20, a cathode 21, terminals 23 and 23' of an electrode generally indicated at 22, and a centrally located gas inlet fitting indicated at 24. Since the polarity and potential of current supplied to 20 and 21 is cyclically varied to control the expansion and contraction of the trapped charge within chamber 5, the devices 20 and 21 will be generally referred to as activating cells, the current supplied thereto affecting the direction and velocity of electrons and rays emanating from the cells.

It has been found that under the conditions hereinafter disclosed, many of the noble gases and elements found in the periodic table, and particularly their isotopes from periods 2, 3, 4 and 5 of the periodic table, are capable of being utilized as the trapped charge in chamber 5 for operation of the present invention. The noble gases are preferred. They do not contain or produce acid containing materials; although they can be caused to create heat, they will not burn; they are sensitive to and respond to radiations, whereupon they radiate themselves. They are capable of picking up mutated electrons and their electron distances permit electron connections. The noble gases found to be most effective are those of neon, argon, krypton and xenon and their isotopes. Some of the isotopes are capable of internal electron conversion very readily and xenon may be cited as a typical example. $Xe^{11}$ is an isotope which is particularly effective in that it is readily capable of internal conversion. Similarly, other gases such as chlorine are unstable in that chlorine contains 8 electrons in the 2nd level and only 7 (instead of 18) in the 3rd level.

Phosphorous and rubidium and its isotopes are examples of elements adapted for use in activating cells 20 and 21; phosphorous contains 8 in the 2nd group and only 5 in the 3rd level; rubidium contains 18 in the 3rd level but only 8 in the 4th level and 1 in the 5th. Mesothorium I or radium D can be used in the activating cells to good advantage, although they have a shorter half-life than rubidium. Elements useful in the activating cells are preferably those capable of emitting electrons, alpha rays, beta rays, gamma rays and X-rays, negative beta rays being particularly useful since they are directed to exert their force (as hereafter described) in the direction of the movement of the end wall of the expanding chamber.

Differently considered, it may be stated that the present invention utilizes those elements and isotopes which can be readily caused to emit alpha rays, beta rays, gamma radiations and electrons. In general it may be stated that substances which decay by the emission of negative beta particles and which are also subject to rearrangement within the atom or decay by orbital electron capture, are effective sources of energy in the fuel and system of the present invention.

Similarly, atoms which exhibit alpha particle emission (which generally involves strong interaction between nucleons), are capable of being utilized. Although alpha decay is normally slow and have half-lives which are longer due to electrostatic barriers that make it difficult for alpha particles to escape, the present invention utilizes periodic discharges of electrical energy which speed up the escape of alpha particles and permit the reactions to be utilized effectively in the method of the present invention.

For purposes of illustration (and without limitation thereto), the following examples of charges, activating cells or ampules and operating conditions are given. The hollow anode and cathode cells may be made of stainless steel, aluminum alloys such as duraluminum, aluminum alloys containing zinc, antimony and cesium. Effective cells were made from an aluminum alloy containing antimony and cesium, said cells containing two grams of red phosphorous 99.5 percent pure in argon periodically approaching 15–20 atmospheres pressure. Anodes were stainless steel vessels each containing one gram of rubidium, the vessels being filled with 20–30 percent refined mineral oil and 70–80 percent argon periodically approaching about 20 atmospheres pressure. The variable volume chambers may contain a precharge composed of between about 10 percent and 25 percent of de-oxygenated water by volume, the remaining volume in the chamber being composed of between about 35 percent and 50 percent of argon, 8 percent and 18 percent of neon, from about 15 percent to 25 percent of xenon and from about 15 percent to 25 percent of chlorine.

A method of precharging each of the variable volume power generating chambers may be carried out in a simple and effective manner, as follows: the variable volume chamber comprising the portions 6 and 7, together with the activating cells 20 and 21 in position, may be first filled with de-oxygenated water through the fitting 24 while the chamber is in its fully expanded position. A mixture of say, 60 percent neon and 40 percent chlorine is now injected into the cylindric cavity until about 10 percent of the water is expelled. The contents of the cylinder are then cycled, agitated or otherwise mixed to cause some of the chlorine to become absorbed by the water.

A mixture of 60–70 percent xenon with say, 30–40 percent chlorine, is then injected into the cylinder until an additional 40 percent of the original volume of decomposed water is expelled by this second gas injection. The contents should again be cycled or thoroughly agitated.

With the chamber now containing approximately 50 percent decomposed water by volume, a mixture composed of about 65 percent argon, 25 percent xenon and 10 percent neon is injected with the cylinder or chamber in a collapsed position until a sufficient amount of water is displaced so as to leave within the cylinder between about 10 percent and 25 percent of water. Thereafter, the cylinder is expanded to maximum volume position and the last named gas mixture is injected so as to create a pressure within the chamber of between about 1.0 and 3.0 atmospheres. The injection fitting 24 is now securely closed and the gases therein are ionized by charging with 110 to 440 volt current for a period of about 6 hours; a longer time is required when the volumes are larger and lower potentials are used on the charging current. Ionization of the charge is conveniently accomplished by supplying the current through the terminals 20 and 23 of an actuating cell and adjacent electrode.

Figure 3:
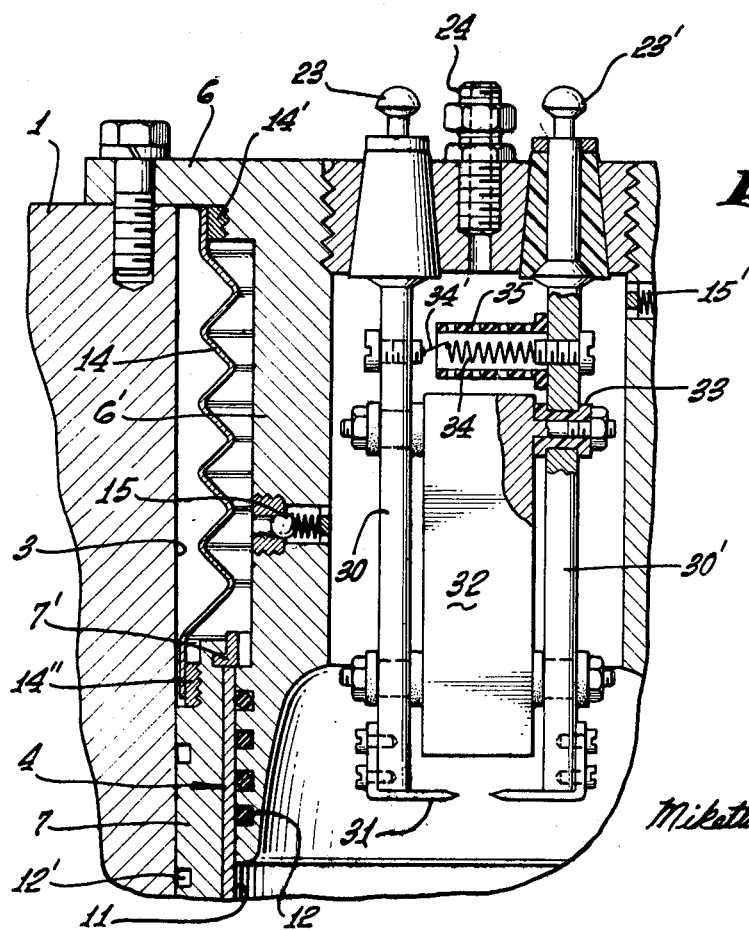
FIG. 3 is a section taken along the plane III—III of FIG. 1.

At this point, it may be noted that the terminal posts 23 and 23' extend as electrodes 30 and 30' into the chamber and terminate in a pair of opposed platinum spark gap points 31 and 31' adapted to produce a glow field under stated conditions of operation. The gap between the electrodes may be from one-sixteenth inch to one-fourth inch depending upon the construction and size of the chamber. The two copper electrodes 30 and 30' carry between them a collector plate 32 which may be made of a copper alloy including magnesium, manganese and aluminum alloy containing some zinc sulfide or preferably from an alloy containing appreciable quantities of antimony and cesium. As shown in FIG. 3, the collector plate 32 is suspended from the electrodes by means of relatively thin insulators 33 capable of breaking down in the event the voltage across the collector 32 and its terminals 30, 30' exceeds about 12 to 24 volts, DC.

Above the collector plate 32, there is mounted a glow coil 34 (preferably made of wolfram) which may be protected by a perforated shroud 35. One end of the coil is connected to electrode 30' and contact with electrode 30 is by way of a thermosensitive, bimetallic element 34' which disconnects the glow coil after the initial heating of the environmental gases has been accomplished.

The collector plate 32 lies in a plane between the two activating cells 20 and 21 as shown in FIG. 2. The preferred distance between the two activating cells may vary from one-fourth inch to three-fourths inch. It is important however that the spark gap 31 of the electrode assembly extend slightly below the bottom of the two activating cells so that when the cylinder or chamber is in its collapsed or minimum volume position, the spark gap extends into the aqueous medium or de-oxygenated water in the bottom of the chamber. Similarly, it is desirable that the extreme lower ends of the activating cells contact or are in very close proximity to the water in the bottom of the chamber when the chamber is in its collapsed position.

May virtually instantaneous radiations, reactions, changes in energy levels, changes in directions of radiations due to electron charges absorbed by the collector plate and electromagnetic field effects, luminescence and fluorescence, photonelectron absorption and emission, endothermic resultants caused by reason of release of chlorine from the water, exothermic resultants caused by discharges between the points of the gap, etc., take place in the chamber. These reversible reactions are controlled by the selection of the atomic constituents of the charge and activating cells and a unique cyclic supply of electrical energy. One form of such control system, adapted for use with any multiple of two variable volume chambers herein before described, is shown in FIG. 4.

Two variable volume chambers of an engine are illustrated at A and B; A is shown at the beginning of an upstroke and B is shown at the beginning of a downstroke toward expansion. Activating cells are indicated diagrammatically at 20 and 21 and the electrodes are indicated at 23 and 23' with the collector plate 32 therebetween. During operation of the system, it is desirable to supply alternating current as well as direct current and for this reason the diagram illustrates an AC generator at 38 and a DC generator at 39. The two generators would normally be initiated and the entire motor started by means of a starting motor and a storage battery. Such conventional starting system is illustrated in the lower right hand corner.

A distributor 40 is diagrammatically illustrated, such distributor having an external distribution ring split into two sections 41 and 42, each covering slightly less than 180°. Two diammetrically opposed contact brushes or spring urged contact points rotate within the distributor, one of the arms 43 being shown beginning its contact with split ring section 41, whereas the other arm 52 is shown beginning a downstroke in contact with ring 42. It will be noticed that arm 44 is constantly supplied with alternating current from the generator 38 whereas arm 43 is grounded and connected to the negative side of DC generator 39. Distributor segment 41 is associated with expansion chamber A whereas segment 42 of the distributor is associated with the variable volume chamber B. Rotation of the contact arms in the distributor is in timed relation with the cycles of expansion and contraction of the variable volume chambers; since the power sources are of two cycle character, one complete rotation of the distributor contact arms corresponds to a full cycle of a chamber.

In the position shown in FIG. 4, it will be noticed that the contact arm 43 is now supplying negative (ground) to segment 41 which is connected by line 44 through a condenser 45 to the cell 21 and one of the electrodes 23' of chamber A which is at the beginning stage of the upstroke. Simultaneously however, contact arm 52 is being supplied from the positive output of the generator 38 with alternating current through segment 42 which is now transmitted by line 54 through a condenser 55 to the corresponding cell 21 and electrode 23' of variable chamber B which is at the beginning of its down or expansion stroke. Simultaneously, branch line 54' (also connected to distributor ring 42 and fed with alternating current), passes through a voltage regulator and actuates an electromagnetic coil 56 of a double pole, single throw, relay switch indicated at 57, whereby switch bar portion 58 assumes the full line position, switch bar 58 being connected at its inner end by line 59 to the negative side of the AC generator and by making contact at terminal 60, connects such negative side by line 61 to the opposite electrode 23 and cell 20 of expansion chamber B.

Simultaneously, while the double pole, single throw relay switch is in full line position, line 68 is supplying positive direct current to the inner end of arm 58' of the switch which is in contact with terminal 72, the opposite end of this conductor being connected as at 70 to line 71 which conveys this direct positive current to actuating cell 20 and terminal 23 within variable volume chamber A.

At this point it is to be noted that during the expansion stroke in chamber B, actuating cell 21 is supplied with positive alternating current while the opposing activating cell 20 is connected to ground or negative terminal. Similarly, the two electrodes 23 and 23' in variable chamber B are supplied with negative and positive alternating current. However, during the upstroke or contraction of chamber A, which occurs concurrently, the system provides positive direct current to actuating cell 20 and terminal 23 of the electrode whereas negative direct current is supplied to the opposing activating cell 21 and the opposite terminal of the electrode 23'.

When DC arm 43 completes its sweep of segment 41 and contacts segment 42, chamber B starts its upward or contraction stroke. Simultaneously arm 52 starts its sweep of segment 41 and chamber A starts its expansion stroke. During these strokes, the switch 57 is in dotted line position (coil 56' energized through line 44'). In chamber A actuating cell 20 will be supplied with negative alternating current or ground, whereas the opposite actuating cell 21 will be supplied with ungrounded alternating current. In chamber B (now contracting cell 20 will be supplied with positive DC and cell 21 with negative DC.

The two cells in a given chamber are therefore sequentially supplied with electrical current differing in potential and polarity, only one cell of a pair being supplied with positive current at a given instant. Supply of electrical current (from an external source) to the two electrodes in a given chamber conforms to the same rule. Such sequential supply controls expansion and contraction of the gaseous environment in the chambers.

The alternating current supply may vary from between about 28 to 500 volts depending upon the volume of each of the chambers; a direct current supply at from approximately 24 to 100 volts is adequate. The presence of capacitors 45 and 55 in lines 44 and 54 is required and will allow the passage of direct current since these currents are in effect of a pulsating type.

Attention is called to the fact that the glow coil 34 is located near the top extremities of the collector plate between the electrodes. The function of the glow coil is to initially preheat the gas mixture of the chamber and the water therein during start-up. Although it is connected to the electrodes, from the bottom of the stroke to the top of the stroke during each cycle, it cannot glow during operation because of the bi-metallic relay or switch 34' referred to hereinabove; therefore the coil will merely short the electrodes without benefit of glow in subsequent phases and will complete the circuit between the condenser electrodes, permitting the collector plate 32 between the electrodes to receive its charge.

During the up or contraction stroke, the electrodes are operating with D.C. and the collector plate 32 is building up its charge potential. The charging of the collector ceases at the beginning of the expansion stroke. During the downstroke, the electrodes receive A.C. and, due to this change in the type of electrical impulse and variation in voltage, the collector plate will short out with high voltage both through the insulators and between the electrodes. This discharge is given impetus by the moist steam which results during the cooling phase of the super heated dry steam from the initiation to the completion of the up or contraction stroke. When the chamber is in its contracted phase, the charge on the condenser is negative and the condenser has excess electrons at the moment of electric discharge. The negative charge condenser attracts or absorbs positive molecules. These positive charges are moving toward the collector plate and the negative charges will be repelled while the positive atoms, which are deficient in electrons, will reach the collector plate and pick up the needed electrons from the plate. Moreover, the collector plate, because of its charge, creates an electric barrier; the charge on the collector plate is negative and has excess electrons at the moment of electrical discharge in the gap between terminals 31 of the electrodes and while the chamber is in its contracted phase. This negative charge on the collector attracts or absorbs positive molecules which are moving toward the collector, while the negative molecules are repelled. The positive atoms which are deficient in electrons will reach the collector plate and will pick up the needed electrons from the plate. During the expansion of the chamber, the positive and negative ions which are created by the gamma ray of the cathode will increase in mass instantaneously by the assimilation of the electron supplied by the generator, whereby the gross pressure resultant within the chamber is increased directly and proportionately. The collision of gas atoms and electrons and molecules results in a high heat coefficient with resultant gas expansion. The amount of heat depends on the charge of the anode and cathode and the charge of the collector plate. The rays from the cathode (phosphorous may be the element) generally travel in a straight vector but can be deflected by an electromagnetic field. Within the chamber, these cathode ray particles will be directed downward toward the bottom of the cylinder during the expansion stroke from the time that the collector plate discharges its static potential previously acquired and from the discharge between the points of the electrodes which are positioned close to the bottom of the cylinder and complete the electric circuit. Owing to the presence of ionized gases and water vapor, the electromagnetic field which is created this way between the electrodes will be the force phenomenon which will attract the otherwise directional migrations of the cathode ray particles toward the bottom of the chamber. Simultaneously the collector plates create an electric barrier above such discharge and field, facilitating the downward deflection of the rays in the direction of movement of the bottom wall of the chamber.

In general there are two forces working in the cylinder, one force is the resultant of the anode, cathode and collector plate short-circuiting and changing the moist steam to a super heated dry steam. The second force is a resultant due to the high temperature/pressure coefficient of the gasses and the directional electrons emanating from the rubidium and phosphorous for example, whose velocity is increased by the electrical impulses to which they are subjected. These free electrons are absorbed by the gases which are capable of assimilating these electrons due to their special nature. The collector plate located between the two cells also attracts some free electrons and adds them to its charge. When rubidium is in one of the cells, it radiates gamma rays which have no negative or positive charge and will not be absorbed by the gases nor the electric components of the cylinder but will cause structural changes in the molecules of the argon which has been subjected to the radiation from the other cell containing phosphorous, and which has been subjected to the supplied A.C. and D.C. The working capacity and the life expectancy of the environment is dependent upon the percentage of the various gases in the mixture, the percentage of water and the quantity and character of the elements in the two activating cells. The causes of the energy produced in this environment are eclectic and are a function of the molecular structures and atomic substructures connected with and altered by the electrons migrating and the molecules of hydrogen and oxygen which are sequentially bound and released due to the interplay of the elements and electrical forces interacting upon the system.

During operation, a certain amount of fluorescence and luminosity is highly desirable within the chambers and in order to stimulate such fluorescence and the emanations from the activating cells, these cells are sequentially supplied with current as previously stated. Electron emissions are therefore stimulated or induced and the electrons from one cell are attracted toward the other cell, the flow of these electrons resulting in electric current. The strength or potential of this current can be increased by the presence of the noble gases in the chamber as well as their quantity and the pressure within the chamber. The presence of these gases aids the flow of the current (EMF) because the flow of electrons from the cathode will be accelerated sufficiently so that collision of the electrons with the gas molecules and atoms occurs, causing fission of the neutral gas atoms and particles permitting them to carry a greater electrical charge (this may be called collision ionization). The cathode also emits beta rays and gamma rays. The gamma rays will induce certain materials to radiate fluorescent light and this has a special function at the expanded position of the chamber and aid by cooling the walls of the cylinders. Heat is removed from the cylinder walls because elementary particles are retrieved from the walls, such particles having previously emanated from the cathode rays.

Within the confines of the chamber, the gas molecules collide with the walls and other gas molecules and change direction; oppositely moving positive and negative molecules attract each other but the neutral molecules will not be able to participate in this current. To increase the number of charged particles which are responsible for the state which causes electrical power, we increase the speed so as to reduce the number of recombinations which tends to result in neutral equilibrium. If the molecular velocity is sufficient, it will tend to inhibit reassociation of gas atoms to reduce the electric ionic charges available to support an electric current and if we sustain sufficient atomic velocity of the gases, we tend to increase the electric current potential. By further increasing the power source of motion, the charged molecules will speed up so fast that collisions with neutral molecules will explode them to nascent particles which are capable of taking charges and the forces acting upon them will begin to move the charged particles in positive and negative directions and into further collisions where they create new charge carrying particles. X-rays created by the cathode knock out or dislodge atoms from the xenon in the chamber and atoms that have lost one or more of their electrons will suffer an electron deficiency. By reason of this, the atom which has lost its electron will have a positive electric charge and the free electrons will be picked up by the argon, neon and krypton isotopes. The gas which accepts the free electrons will have a negative charge. The xenon will replace its lost electrons from electrons assimilated from the collector plate surplus. The charge on the collector is negative as previously stated.

The element in one of the cells should be capable of emanating alpha ray particles so as to produce a fluorescense or luminescence which encourages beta and gamma propagation. Phosphorous, mesothorium or radium can be so employed, the latter elements permitting the utilization of additional charges. The alpha ray particles collide with the zinc sulfide crystals on the collection plate. Moreover, the aforesaid elements also create ultraviolet rays which also force electrons to emanate from the zinc, aluminum or other metals employed for the housings of the cells. The photons thus obtained by the luminescence are of value in that their removal from the metal walls assists in cooling.

During the upstroke or contraction, A.C. is withdrawn and D.C. is supplied to the cells and electrodes from the distributor.

The "Neutral Electrons" which were forced to explode, loose their charges and will again become "Neutral Electrons" since the collector will retrieve their charges. (The theory of Neutral Electrons evolving suggests that electrons with a given mass when carrying a charge of electricity are in negative phase but may be stripped of their charge and revert to a positive condition devoid of the electrical charge normally attributed to them.) The xenon is in need of charges and will reassimilate its lost electrons from the argon and neon. The huge electron surplus originally admitted via the cathode will migrate through the closed circuit of the flow coil shunt or relay and will drain excess electrons to the generator which is extraneous to the internal electron system. A collector plate or electron sink between the electrodes and the distributor modulates the exodus of electron surpluses. The quantity of electrons which are returned by the distributor at the top of the stroke, combined with the low EMF current from the generator results in a very powerful charge to the previously charged collector plate inside the cylinder, resulting in a high magniture explosive discharge at the top of the stroke. The radiation of the phosphorus (or alternates) placed in the cathode will be reduced, almost stopped (with the exception of the gamma ray) because the current of electrons will now have opposite direction (polarity) which will result in opposite charge, owing to the change of polarity mentioned above. The same will happen with the rubidium in the anode, and even its radiating capacity will be intensified to a certain degree, with the aid of the charge laden electron current. The charge laden electron stream entering the anode from the generator will have a negative charge and will pick up the particles and electrons which were eliminated by the gases and will circulate them from the anode to the cathode. The same will happen with the electrons and particles which will be released from the cylinder wall and which will result with the aid of water vapor in a diminution or loss of sensible heat. The cylinder wall will cool and it will cool the hot gases and the high pressure dry water steam. Small amounts of water vapor will even condense on the cylinder wall. Total and complete condensation of the water and cooling cannot occur because within a fraction of a second, the heating cycle will commence. The rubidium rays will be (alpha and gamma) intensified during the reversed polarity upstroke cycle. At the moment of the next discharge between gap points of the electrode, 80 to 85 percent of the water will become moist steam and 15 to 20 percent will condense to liquid water. The resultant residue will settle on the cylinder wall and will be chemically harmless, because it consists of only the atrophied electrons of the electricity.

A complete four cylinder engine made in accordance with this invention wherein the movable wall portions of the four variable volume chambers were connected to a crank shaft of an engine so as to convert the linear reciprocation of such wall portions into rotary motion was constructed and successfully operated and demonstrated. Each of the cylinders had a gross volume of 8½ cubic inches and a net displacement of 5.5 cubic inches. The activating cells in each cylinder contained 1 gram of rubidium and 2 grams of phosphorus respectively, and where made in accordance with the specific example given hereinbefore. The environment within each chamber had the composition given hereinbefore consisting of de-oxygenated water, xenon, neon, argon, and chlorine. The precharging method hereinbefore disclosed was employed. The electrical energy sources utilized were direct current at 27 volts and alternating current at 42 volts.

Starting of the engine occurred after 4 to 6 revolutions of the engine by a conventional starting motor. The timing of the distributor during operation of the engine was advanced to initiate changes in type of current supplied to the activating cells a few degrees in advance of dead center. The engine accelerated rapidly (to about 1,500 rpm in less than one second) and then at a somewhat slower rate to between 2,500 and 3,000 rpm (attained in less than two seconds from start). Although electron reactions involving temperatures on the order of 2,000°– 3,000° occur at the peak in the expansion portion of the cycle, the walls of the engine showed a temperature of 75°–80° at the end of protracted runs. No cooling water was employed; a circulating oil system injected some oil through the wall of the block into the outer grooves of the movable wall portion of each chamber cylinder. Momentary pressures of between 700 and 800 pounds per square inch appear to have been developed in the chambers. The engine was quiet during operation. A power output of about 70 hp was apparently produced at 2,500 rpm.

Rectilinear motion of the movable wall portion of the variable volume chamber or chambers (which is obtained in accordance with the mode of operation described hereinabove) may be changed or translated into rotary motion, intermittent motion or rectilinear motion of intermittent or practically uniform velocity by the use of many different types of mechanisms which are within the skill of mechanical engineers and designers. The shafts, arms, rods, linkages or other force transfer means energized by the power source of the present invention may be used for the manipulation, adjustment, positioning, lifting, etc. of any desired device or element. The regenerative two cycle character of the example given herein, its compactness, ability to provide high energy output at relatively low rpm (1,500–3,600), the simple construction (no valves or valve actuating mechanisms, cooling systems, air supply or supercharges, no exhaust or muffler) and light weight, as well as the ability of the system to operate for thousands of hours without refueling or recharging, provides solutions to present and future problems involving the generation and utilization of power in isolated locations and under exotic conditions.

I claim:

1. A variable volume gas-tight chamber within a normally stationary hollow cylinder element and a hollow element telescopically related to the first element and movable with relation to the first element, said chamber, when in expanded position, containing an effective charge of 10 to 25 percent of de-oxygenated water, by volume, and the remaining volume being composed of a mixture of three or more gases whose atoms do not have their outer quantum levels completely satisfied with orbital electrons, the contents of said chamber being at a pressure of between about 1.0 and 3.0 atmospheres at normal temperatures.

2. A variable volume chamber as stated in claim 1 wherein at least some of said gases have the property of emitting an electron upon absorption of a photon.

3. A variable volume chamber as stated in claim 1 wherein the remaining volume is composed of a mixture of xenon, neon, argon and chlorine.

4. A variable volume chamber as stated in claim 1 wherein the remaining volume is composed of between about 35 percent and 50 percent of argon, 8 percent and 18 percent neon, about 15 percent to 25 percent xenon, and from about 15 percent to 25 percent of chlorine.

5. A variable volume chamber as stated in claim 1 wherein the chamber contains a pair of hollow activating cells, said cells containing elements having the property of emitting electrons, and alpha, gamma and beta radiations, one of the cells containing an element of higher molecular weight than the other, and both cells containing argon.

6. A variable volume chamber as stated in claim 1, wherein the chamber contains a pair of hollow activating cells, said cells containing rubidium and phosphorous, respectively.

7. A variable volume chamber as stated in claim 5 including means for periodically and sequentially supplying said cells with electrical current differing in potential and polarity, only one cell of a pair being supplied with positive current at a given instant.

8. A variable volume gas-tight chamber within a normally stationary hollow cylinder element and a hollow element telescopically related to the first element and movable with relation to the first element,
   a pair of hollow, sealed activating cells carried by the normally stationary cylinder element and extending into the chamber, said cells containing elements having the property of emitting electrons, and alpha, gamma and beta radiations;
   said chamber containing an effective charge of between about 10 percent and 25 percent of de-oxygenated water, by volume, and the remaining volume being composed of a mixture of three or more noble gases, characterized by ability to withstand heat without burning and non-acid in character, at least some of said gases having the property of emitting an electron upon absorption of a photon;
   the contents of said chamber, when in expanded but not energized position, being at a pressure of between about 1.0 and 3.0 atmospheres;
   and means for sequentially supplying said cells with electrical current differing in potential and polarity, only one cell of a pair being supplied with positive current at a given instant.

9. A variable volume chamber as stated in claim 8 including a pair of spaced electrodes carried by the normally stationary cylinder element and extending into the chamber between said activating cells, said electrodes terminating in a spark gap at a level adapted to contact the water content of said chamber when said chamber is in collapsed, minimum volume position, and an electron collector plate carried by and between said electrodes, said pair of electrodes being supplied sequentially with current differing in potential and polarity in a manner as stated for said cells.

10. A variable volume chamber as stated in claim 9 wherein the gases of said charge are composed of a mixture of xenon, neon, argon, and chlorine and said cells contain rubidium and phosphorous, respectively.

11. A method of precharging a variable volume power generating chamber within a normally stationary hollow cylinder element and a hollow element telescopically related to the first element and movable with relation to the first element, which comprises:
    displacing air from the interior of or the chamber with de-oxygenated water;

injecting a mixture of a noble gas and chlorine to displace between about 8 percent and 15 percent of the volume of water contained in said chamber and agitating the contents of the chamber;

injecting further mixtures of another noble gas and chlorine to displace between about 30 percent and 45 percent of additional water from the chamber, and agitating the contents of the chamber;

injecting a further mixture of noble gases into the chamber to displace water in quantities sufficient to retain only between about 10 percent and 25 percent by volume of de-oxygenated water in the chamber, the remaining volume being composed of a mixture of at least three of said gases at a pressure of between about 1.0 and 3.0 atmospheres when the chamber is in expanded position;

and ionizing the charge by subjecting it to the action of an ionizing current for a period of several hours.

12. A method as stated in claim 11 wherein the ionization is carried out by means of an alternating current at a voltage of between 110 and 440.

13. A method of generating power pulses in rapid succession within a sealed, variable volume chamber including a stationary wall portion and a movable wall portion telescopically related thereto which comprises:

positioning two sealed activating cells in said chamber, said cells being attached to the stationary wall portion and containing elements adapted to emit alpha, beta and gamma radiations;

positioning an electron collector plate supported in weakly insulated relation by a pair of electrodes between said activating cells;

providing an environment in the chamber surrounding said activating cells and electron collecting plate composed essentially of a mixture of ionized noble gases and deoxygenated water;

and mass producing reversible, rearrangements of electrons in atoms of said environment into and out of higher energy states in pulses and rapid succession by actively stimulating the emission of alpha rays toward the movable wall portion of the chamber to cause expansion and supplying electric current to said cells alternately to cause expansion and contraction of the contents of said chamber and correlated reciprocating movement of the movable wall portion.

14. In a method as stated in claim 13, the step of supplying electrical current to at least one of the electrodes, in timed relation of the movement of the movable wall portion, to produce an electrical discharge between the electrodes at virtually the beginning of expansion movement of the movable wall portion and to produce a magnetic field between said cells to deflect radiations emitted by the cells in the direction of said expansion movement.

15. In a method as stated in claim 13, the steps of supplying positive direct current to one of said activating cells and to one of said electrodes while the chamber is contracting, and then supplying positive alternating current to the other cell and other electrode to cause the environment in the chamber to expand and impart an expansive movement to the movable wall portion, said direct current being supplied in pulses at a potential of between about 27 and 100 volts and said alternating current being supplied at a potential sufficient to produce an electrical discharge between the electrodes at virtually the beginning of expansion movement of the movable wall portion and cyclically repeating the aforesaid steps to effectively utilize the potential energy forces of the cell elements and environment into kinetic energy of the movable wall portion.

16. In a method as stated in claim 15, the step of facilitating the emission of electrons from atoms in said environment by stimulating the production of fluorescence and luminescense within the chamber to provide protons.

17. A method as stated in claim 15 wherein elements from the group consisting of rubidium, mesothorium, radium and phosphorus are contained in said activating cells.

18. A method as stated in claim 15 wherein the environment in the chamber includes xenon, neon, argon, krypton and chlorine.

* * * * *